(12) United States Patent
Kimes (10) Patent No.: US 7,942,781 B2
(45) Date of Patent: May 17, 2011

(54) HIGH-EFFICIENCY VEHICULAR TRANSMISSION

(75) Inventor: James W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 389 days.

(21) Appl. No.: 12/211,236

(22) Filed: Sep. 16, 2008

(65) Prior Publication Data

US 2009/0098970 A1 Apr. 16, 2009

Related U.S. Application Data

(60) Provisional application No. 60/998,773, filed on Oct. 12, 2007.

(51) Int. Cl.
*B60W 10/08* (2006.01)
(52) U.S. Cl. .......................................................... 477/5
(58) Field of Classification Search ................... 475/2, 5; 477/5
See application file for complete search history.

(56) References Cited

U.S. PATENT DOCUMENTS

| | | | |
|---|---|---|---|
| 5,342,258 A | 8/1994 | Egyed | |
| 5,927,455 A | 7/1999 | Baker et al. | |
| 6,244,965 B1 | 6/2001 | Klecker et al. | |
| 6,290,044 B1 | 9/2001 | Burgman et al. | |
| 6,328,670 B1 * | 12/2001 | Minowa et al. | 477/5 |
| 6,692,405 B2 * | 2/2004 | Minowa et al. | 477/5 |
| 6,846,257 B2 * | 1/2005 | Baker et al. | 475/5 |
| 6,953,409 B2 | 10/2005 | Schmidt et al. | |
| 7,093,512 B2 | 8/2006 | Ibamoto et al. | |
| 7,223,198 B2 | 5/2007 | Kimes et al. | |
| 7,256,510 B2 | 8/2007 | Holmes et al. | |
| 7,258,214 B2 | 8/2007 | Pawley et al. | |
| 7,344,010 B2 | 3/2008 | Fetting, Jr. et al. | |
| 7,695,387 B2 * | 4/2010 | Oba | 475/5 |
| 7,806,795 B2 * | 10/2010 | Oba et al. | 475/5 |
| 2006/0252589 A1 | 11/2006 | Tay | |
| 2006/0278487 A1 | 12/2006 | Pawley et al. | |

OTHER PUBLICATIONS

International Search Report and Written Opinion dated Dec. 5, 2008 for the corresponding PCT application Serial No. PCT/US08/78901 filed Oct. 6, 2008.

* cited by examiner

*Primary Examiner* — Dirk Wright
(74) *Attorney, Agent, or Firm* — Brooks Kushman P.C.

(57) ABSTRACT

A high-efficiency vehicular transmission is provided. The transmission includes a transmission housing, a set of torque delivery elements which include first and second elements supported for rotation within the housing and an electric motor for changing angular velocity of at least one of the elements in response to an electrical signal during a shift to obtain a desired transmission ratio. At least one non-friction controllable coupling assembly has a coupling state for coupling the first element to either the second element or the housing and an uncoupling state for uncoupling the first element from either the second element or the housing, respectively. The at least one coupling assembly is non-hydraulically controlled to change state to maintain the desired transmission ratio.

22 Claims, 4 Drawing Sheets

HIGH-EFFICIENCY VEHICULAR TRANSMISSION

CROSS-REFERENCE TO RELATED APPLICATIONS

This application claims the benefit of U.S. provisional patent application Ser. No. 60/998,773 filed Oct. 12, 2007 and entitled "Synch Shift Transmission."

BACKGROUND OF THE INVENTION

1. Field of the Invention

This invention relates to vehicular transmissions such as step ratio automatic transmissions.

2. Background Art

Figure 1:
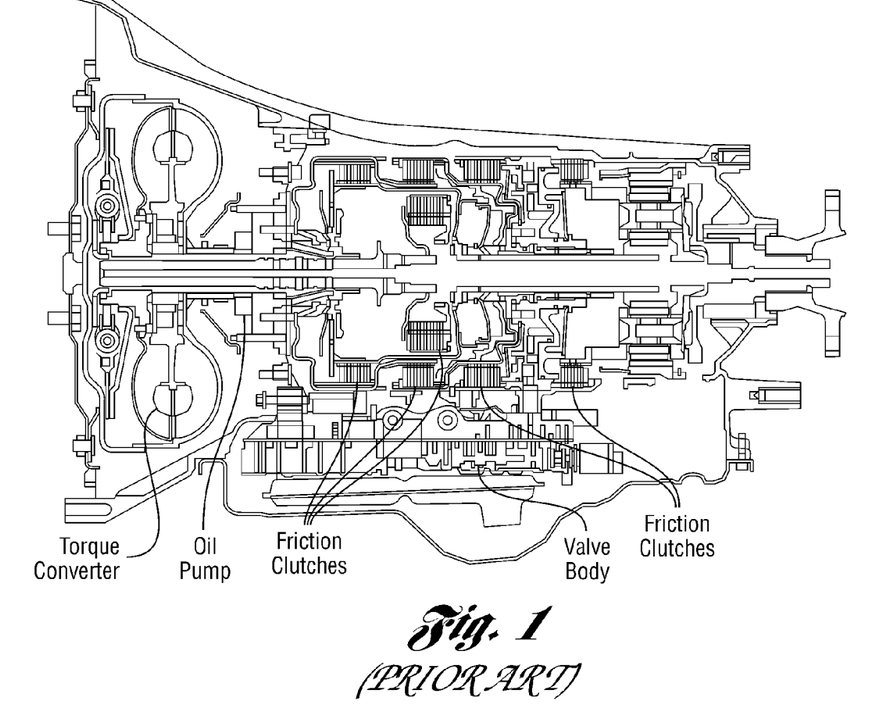
FIG. 1 is a side view, partially broken away and in cross-section, of a prior art multi-speed automatic transmission for an automotive vehicle and generally constructed in accordance with U.S. Pat. No. 5,106,352 (i.e., the '352 patent)

Today's step ratio automatic transmissions use hydraulics to power the ratio change, dampen NVH, power coupling/decoupling, and providing lubrication and cooling. This is achieved with the use of a torque converter (for coupling/decoupling power, multiplying torque, and NVH dampening), an oil pump, valve body (or hydraulic logic), and friction-type clutches (bands and frictions as shown in FIG. 1).

The torque converter provides fluid coupling between the engine and the transmission. A typical torque converter comprises: an impeller which is rigidly connected to the torque converter housing; a turbine which is splined to the input shaft (turbine shaft) of the transmission; and a stator which includes a one-way clutch. An inner race of the one-way clutch is splined to a stationary shaft attached to the transmission.

The transmission oil pump is used to circulate oil and provide pressure for hydraulic operation. The pump is driven by the torque converter shell and rotates with the engine. Fluid is drawn from a sump through a filter and is distributed to the various transmission hydraulic systems.

The hydraulic control components of a transmission include an electro/hydraulic valve body. The valve body assembly is the main shift control element in the transmission. In non-EH (i.e., electro/hydraulic) transmissions the valve body was only hydraulically controlled. In current EH transmissions the valve body is similar in design, but now also houses a number of shift solenoids which are controlled by a transmission control module.

The valve body consists of a number of sub-assemblies. Each sub-assembly contains a number of spool valves which are hydraulically controlled. Most spool valves are opposed by spring pressure. The spool valves are used to direct hydraulic fluid flow to the various shift elements in the transmission. There is also a manual valve which is connected to the shift assembly by a cable. The manual valve allows the drivers to select the basic operating mode (or ratio).

The valve body is responsible for:
regulating main pressure;
controlling fluid flow to shift elements for upshifts and downshifts;
providing for manual operation by driver via manual valve;
reverse lockout;
failsafe operation;
shift comfort through:
overlap shift control; and
pressure accumulators;
torque converter control; and
distribution of lubrication.

Multi-Plate Friction-Type Clutches and Brakes

Clutches and brakes are used to drive or hold members of a planetary gear set, respectively. As a general rule, multi-plate clutches connect one planetary member to another. Multi-plate brakes connect a planetary member to the transmission case to hold it stationary.

The clutches and brakes consist of a number of friction discs and steel discs. The friction discs are coated with a friction material and have engaging lugs (splines) on the inner perimeter. The steel discs are steel on both sides and have engaging lugs located on the outer perimeter. The engaging lugs on the friction discs are usually engaged with a planetary member. The engaging lugs on the steel discs are usually engaged with the clutch piston housing.

In addition to the friction and steel discs, there is also an apply piston, housing and return spring. Once hydraulic fluid is applied to the clutch assembly, the friction discs and steel discs will be locked together. Once hydraulic pressure is released, the return spring will cause the clutch piston to return to its rest position which will unlock the clutch assembly.

A band-type brake is used for some applications. The brake band is a circular band with friction material bonded to the inner surface. The band wraps around a particular planetary component (clutch drum) and locks that component to the transmission case. The brake band is applied and released by the clutch apply piston.

In order to carry out a shift in ratio, fluid needs to be applied or released from the multi-plate clutch (or brake). The following method occurs:

1. Fluid from a shift valve in the valve body is applied to the clutch assembly.
2. Fluid pressure builds behind the apply piston and overcomes the resistance from diaphragm spring.
3. The friction and steel discs are compressed together and become locked, preventing any slippage between them.
4. Two planetary members are now locked together.
5. When fluid pressure is released, the steel and friction discs are allowed to unlock.

This method has had some advantages. The power density is very high using hydraulics to clamp clutches and to multiply torque. Hydraulic systems have proven to have good dampening characteristics and smooth shift capability. It is also a natural way to lubricate the components in the transmission and to carry away heat from torque converters, pumps, gear sets, bearings, etc.

However, there are a few disadvantages. The first is efficiency. The pump is always on and pumping oil whenever the engine is running. When a friction element is turned on, power is used to maintain the clamping pressure of that friction element.

The slipping of the torque converter is also a significant source of loss and the open friction elements in the transmission provide drag and thus losses also. Another disadvantage is the complexity of these components. Clutches, pumps, torque converters, and valve bodies are the most likely components to have issues and thus drive warranty cost and negatively impact upon customer satisfaction. These components also tend to be the most expensive components in the transmission.

A typical one-way clutch consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting. Also there is a one-way clutch in the stator of the torque converter as previously mentioned.

U.S. Pat. No. 5,927,455 discloses a bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them, one plate being connected to the driving member and the other plate being connected to the driven member, each plate having strut recesses, a series of struts located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,290,044 discloses a selectable one-way clutch assembly for use in an automatic transmission comprising a strut plate rotatable about a central hub and having pockets and struts mounted therein for pivotable rotation. A selecting plate concentrically located about an activator hub has teeth extending axially inboard and configured to fit in the apertures in an activator plate. A turning device is selectively operable to activate one-way clutching mode by rotating the pin of a control plate to disengage selecting cams and displace selecting plate teeth inboard beyond the inboard face of the activator plate wherein the struts catch the teeth when the strut plate assembly is rotated in a clutching direction. The catching ends of the struts are cammed in the pockets by ramped camming ends of the teeth when the strut plate assembly is rotated in the opposing direction, thereby allowing freewheeling of the strut plate in the overrun direction.

U.S. Pat. No. 7,258,214 discloses an overrunning coupling assembly and a method of controlling the engagement of planar first and second members wherein two sets of opposed engaging struts are applied with one motion of a single control plate or member. The planar first and second members have inside surfaces extending generally normal to a first axis. The assembly includes free-floating, forward keys and free-floating, reverse keys opposed to the forward keys. The forward and reverse keys are movable between a notch-engaging, engaged position and a disengaged position in which the second member is permitted to free-wheel relative to the first member. The planar control member is disposed between the first and second surfaces and is controllably rotatable about the first axis between first and second angular positions relative to the first member.

U.S. Pat. No. 7,344,010 discloses an overrunning coupling assembly and a method of controlling the engagement of planar first and second members wherein the assembly includes clustered pawls and their respective pawl-holding portions. The planar first and second members have inside surfaces extending generally normal to a first axis. The pawls include a forward set of free-floating pawls and a reverse set of free-floating, clustered pawls. The forward and reverse sets of pawls are movable between a notch-engaging, engaged position and a disengaged position. Because of the clustering, a control element, disposed between the first and second surfaces, need not be fully circular and is controllably rotatable about the first axis between first and second angular positions relative to the first member.

Published patent application US 2006/0278487 discloses an overrunning radial coupling assembly or clutch and a method of controlling the engagement of inner and outer plates or members of the assembly wherein adjacent engaging radial locking pawls are selectively controlled by a single, rotatable control plate or element to obtain full lock, one-way lock and one-way overrun conditions. The assembly includes free-floating, forward pawls and free-floating, reverse pawls adjacent to their respective forward pawls. The forward and reverse pawls are movable between a notch-engaging, engaged position (i.e., full lock condition) and a disengaged position in which the outer member is permitted to free-wheel relative to the inner member in the one-way overrun condition in one direction about a first axis and the outer member is locked to the inner member in the one-way lock condition in the opposite direction. A number of different embodiments of the assembly and method are provided.

U.S. Pat. No. 6,953,409 discloses a two-mode, compound-split, electra-mechanical transmission which utilizes an input member for receiving power from an engine, and an output member for delivering power from the transmission. First and second motor/generators are operatively connected to an energy storage device through a control for interchanging electrical power among the storage device, the first motor/generator and the second motor/generator. The transmission employs three planetary gear sets. Each planetary gear arrangement utilizes first, second and third gear members. Moreover, one gear member of the first or second planetary gear set is operatively connected to the input member, and one gear member of the third planetary gear set is selectively connected to ground. A lock-up clutch selectively locks two of the planetary gear sets in a 1:1 ratio.

U.S. Pat. No. 7,256,510 discloses an electro-mechanical transmission having only a single motor/generator, at least one differential gear set and two torque-transmitting mechanisms. A first of the torque-transmitting mechanisms is selectively engageable to establish a first continuously variable operating mode and a second of the torque-transmitting mechanisms selectively engageable to establish a second continuously variable operating mode and a synchronous shift between the two operating modes is achievable. A method of control is provided in which vehicle operating characteristics are analyzed to identify a target operating state in terms of operating mode and ratio based on the available motor torque and motor power and on maximizing energy efficiency. The transmission is controlled to approach this operating mode as closely as possible and the diverge away from the optimum torque operating with zero net battery use as the battery charge of the battery connected with the motor/generator accumulates or depletes.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF THE INVENTION

An object of at least one embodiment of the present invention is to provide an improved vehicular transmission which eliminates the need for a torque converter, oil pump, valve body, and friction clutches. The transmission does not use any hydraulic circuits for power transmission.

In carrying out the above object and other objects of at least one embodiment of the invention, a high-efficiency vehicular transmission is provided. The high-efficiency vehicular transmission includes a transmission housing. The transmission further includes a set of torque delivery elements which includes first and second elements supported for rotation within the housing. The transmission still further includes an electric motor for changing angular velocity of at least one of the elements in response to an electrical signal during a shift to obtain a desired transmission ratio and at least one non-friction controllable coupling assembly which has a coupling state for coupling the first element to either the second element or the housing and an uncoupling state for uncoupling the first element from either the second element or the housing, respectively. The at least one coupling assembly is non-hydraulically controlled to change state to maintain the desired transmission ratio.

The set of torque delivery elements may include a subset of elements comprising at least one planetary gear set.

The at least one non-friction coupling assembly may include an overrunning coupling assembly which allows the first element to free-wheel relative to either the second element or the housing in the uncoupling state.

The overrunning coupling assembly may include a first member coupled to the first element, a second member coupled to either the second element or the housing and at least one ratcheting member for selectively coupling the first and second members together in the coupling state.

The transmission may be an automatic transmission.

The transmission may be a multi-speed, step ratio transmission for automotive vehicles.

The transmission may further include at least one electromechanical device to control the state of the at least one coupling assembly in response to an electrical signal.

The at least one electromechanical device may include an electric solenoid.

The at least one electromechanical device may include a stepper motor.

The electric motor may be mounted within the case.

The transmission may include a plurality of non-friction, non-hydraulically-operated coupling assemblies.

The plurality of non-friction coupling assemblies may include at least one one-way clutch assembly and at least one one-way brake assembly.

The electric motor may synchronize shifts for seamless shifting between transmission ratios.

The electric motor may provide torque during a shift between transmission ratios.

The electric motor may be utilized for launch assist in response to a control signal.

The electric motor may be utilized in idle off operations in response to a control signal.

The electric motor may soften one-way clutch engagements to obtain lower NVH in response to a control signal.

The electric motor may be utilized for regenerative braking in response to a control signal.

Further in carrying out the above objects and other objects of at least one embodiment of the invention, a step ratio vehicular transmission is provided. The step ratio vehicular transmission includes a transmission housing. The transmission further includes a set of torque delivery elements which includes first and second elements supported for rotation within the housing. The transmission still further includes an electric motor for changing angular velocity of at least one of the elements in response to an electrical signal during a shift to obtain a desired transmission ratio and at least one controllable overrunning coupling assembly which has a coupling state for coupling the first element to either the second element or the housing and an uncoupling state for uncoupling the first element from either the second component or the housing, respectively. The at least one coupling assembly is non-hydraulically controlled to change state to maintain the desired transmission ratio.

Still further in carrying out the above object and other objects of at least one embodiment of the invention, a step ratio vehicular transmission is provided. The step ratio vehicular transmission includes a transmission housing. The transmission further includes a set of torque delivery elements. A subset of the elements includes at least one planetary gear set supported for rotation within the housing. The transmission still further includes an electric motor for changing angular velocity of at least one of the elements in response to an electrical signal during a shift to obtain a desired transmission ratio and at least one controllable overrunning coupling assembly which has a coupling state for coupling a first torque delivery element of the at least one planetary gear set to either a second torque delivery element or the housing and an uncoupling state for uncoupling the first torque delivery element from either the second torque delivery element or the housing, respectively. The at least one coupling assembly is non-hydraulically controlled to change state to maintain the desired transmission ratio.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 2:
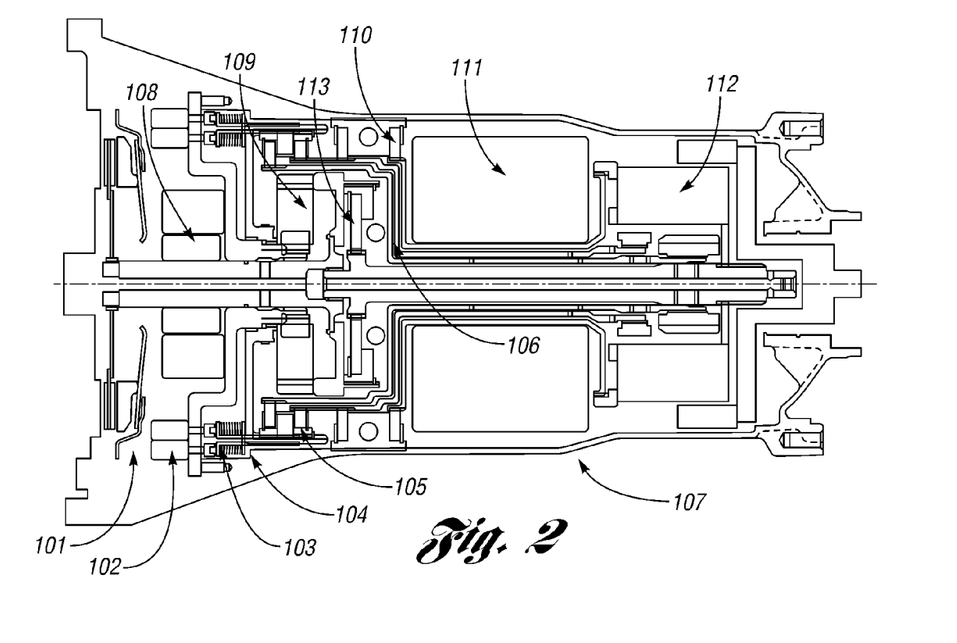
FIG. 2 is a view of a vehicular transmission, constructed in accordance with at least one embodiment of the present invention, the view being similar to the view of FIG. 1; the transmission of FIG. 2, however, includes an electric synchronizing (i.e., sync) motor and controllable or selectable one-way clutches which eliminate the torque converter, the oil pump, valve body and friction clutches of FIG. 1.

Referring now to FIG. 2, there is illustrated a sectional view of a vehicular step ratio transmission, generally indicated at 10, constructed in accordance with at least one embodiment of the present invention. The transmission 10 uses a Lepelletier 6-speed power flow to illustrate how at least one embodiment of the invention operates. The '352 patent discloses such a multi-speed automatic transmission. In one embodiment disclosed in the '352 patent, the transmission 10 includes a simple planetary gear set and a compound planetary gear set of the Ravigneaux type.

The following is a list of some of the parts shown in FIG. 2:
101 Luk ball ramp clutch
102 Electric stepper motors for "A" and "B" clutches
103 Apply bearing
104 Return spring
105 "A" and "B" OWC module
106 "E" clutch solenoid/stepper motor
107 Case/housing
108 Transformer for "E" clutch
109 Front under-drive planetary gear set
110 "C" and "D" OWC module
111 Electric sync motor
112 Ravigneaux gear set
113 "E" clutch.

Figure 3:
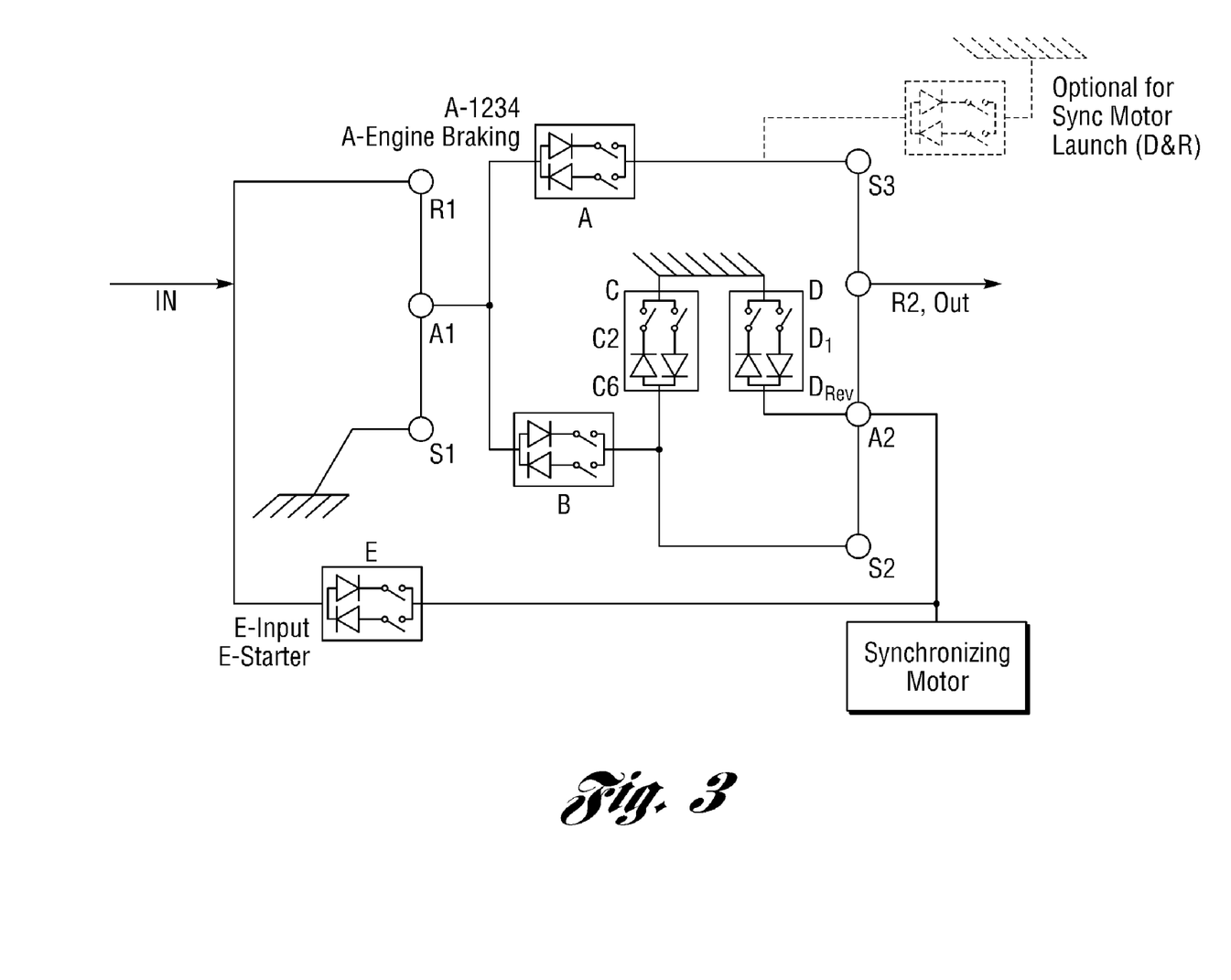
FIG. 3 is a lever diagram which corresponds to the transmission of FIG. 2.

In the embodiment of FIGS. 2 and 3, the transmission 10 includes an input shaft (labeled "IN" in FIG. 3) and an output shaft (labeled "OUT" in FIG. 3) supported for rotation within the housing or case 107, wherein the two shafts are parallel.

The simple planetary gear set 109 includes a ring gear R1 fastened to the input shaft, a planet carrier A1 connected to a first control clutch A and to a second control clutch B of the module 105, planet pinions, and a sun gear S1 fixed relative to the housing 107. These torque transmitting elements form a first power path having a first fixed speed ratio $G_1$.

The input shaft directly drives the third control clutch E (113) and forms a second power path having a second fixed speed ratio $G_2$.

The double planetary gear set 112 comprises four members and is of the Ravigneaux type. The gear set 112 includes a basic gear set whose planet carrier carries a first set of planet pinions meshing with a second set of planet pinions (collectively, A2) and with a second sun gear S2, a third sun gear S3 and a ring gear R2. The first member, S3, is formed by the third sun gear, the second member, R2, is formed by the ring gear, the third member, A2, is formed by the planet carrier and the fourth member, S2, is formed by the second sun gear.

The four members S3, R2, A2 and S2 are associated with the three control clutches A, B (of OWC module 105) and E 113, and two control brakes C and D (of OWC module 110) as shown in FIG. 3. The description of operation is as follows and a torque and speed chart follows the description.

The first member S3 is associated with the first control clutch A, the second member R2 is fixed for rotation with the output shaft, the third member A2 is associated with the third control clutch E and with a first control brake D, and the fourth member S2 is associated with the second control clutch B and with a second control brake C.

Operation is as follows:

In first gear, the first control clutch A and the first control brake D are engaged. The first member S3 is driven according to speed ratio $G_1$ and the third member A2 is held against rotation. Motion is transmitted according to speed ratio $G_1$ and the low reduction ratio of the double planetary gear set 112.

In second gear, the first control clutch A and the second control brake C are engaged. The first member S3 is driven according to speed ratio $G_1$ and the fourth member S2 is held against rotation. Motion is transmitted according to speed ratio $G_1$ and the intermediate reduction ratio of the double planetary gear set 112.

In third gear, the first and second control clutches A and B are engaged. The first and fourth members S3 and S2 and the double planetary gear set 112 are driven as a unit according to speed ratio $G_1$. Motion is transmitted at speed ratio $G_1$.

In fourth gear, the first and third control clutches A and E are engaged. The first member S3 is driven according to speed ratio $G_1$ and the third member A2 is driven according to speed ratio $G_2$ higher than $G_1$. Motion is transmitted according to a ratio intermediate speed ratios $G_1$ and $G_2$.

In fifth gear, the second and third control clutches B and E are engaged. The third member A2 is driven according to $G_2$ and the fourth member S2 is driven according to $G_1$ lower than $G_2$. Motion is transmitted according to $G_2$ and an intermediate overdrive ratio due to the double planetary gear set 112.

In sixth gear, the third control clutch E and the second control brake C are engaged. The third member A2 is driven according to $G_2$ and the fourth member S2 is held against rotation. Motion is transmitted according to $G_2$ and the entire overdrive ratio of the double planetary gear set 112.

In reverse drive, the second control clutch B and the first control brake D are engaged. The fourth member S2 is driven according to $G_1$ and the third member A2 is held against rotation. Motion is transmitted according to $G_1$ and the reverse drive ratio of the double planetary gear set 112.

Table 1, immediately below, is an exemplary chart of the coupling (i.e., OWC) elements in relation with these seven operating modes.

TORQUE AND SPEED CHART

| | | | OWC Element Application Chart | | | | |
|---|---|---|---|---|---|---|---|
| Gear | Ratio | Step | A | B | C | D | E |
| 1 | 4.171 | | X | | | X | |
| 2 | 2.34 | 1.783 | X | | X | | |
| 3 | 1.521 | 1.538 | X | X | | | |
| 4 | 1.143 | 1.331 | X | | | | X |
| 5 | 0.867 | 1.318 | | X | | | X |
| 6 | 0.691 | 1.255 | | | X | | X |
| Rev | −3.403 | 82% | | X | | X | |

It will be noted that these seven modes correspond to different combinations of pairs of the three clutches and two brakes, minus the two prohibited combinations of the third clutch E with the first brake D and of the second clutch B with the second brake C, which hold the input shaft against rotation and releases the output shaft.

The transmission 10 does not have any friction clutches as in the prior art transmission of FIG. 1, but rather has selectable one-way clutches A, B, C, D and E. This approach eliminates the need for a pump and valve body by using electric solenoids or stepper motors or other electrical devices to turn the selectable clutches on or off as described with reference to FIG. 2. The control plate of each selectable or controllable OWC (A, B, C, D or E) is coupled to linearly movable rod or shaft of a solenoid or a transmission rod connected to the rotary shaft of a stepper motor such as motors 102 or solenoid/stepper motor 106. A transformer such as the transformer 108 may be used to provide the necessary voltage for the stepper motor/solenoid. An apply bearing such as an apply bearing 103 may be used to apply the shifting force to the controllable OWC against the biasing action of a compression spring such as the return spring 104. Many ways may be used to move the control plate of the OWCs such as shown in U.S. Pat. No. 6,290,044.

The torque converter of FIG. 1 is replaced by the ball-ramp type clutch 101 (dry or wet) and the electric motor 111. The ratio changes during a shift are done by changing speeds of the various torque transmitting elements within the transmission 10 by acceleration of the electric motor 111 as a second input into the transmission 10. Once the desired ratio is achieved in the case 107, the ratio is held or latched. The electric sync motor 111 is then turned off. The method of latching or holding the ratio can be achieved by a number of ways. One of the most efficient and power dense methods is the use of a selectable OWC such as a mechanical diode, rocker clutch, sprag or roller OWC. This method of ratio changing can work on a number of different power flows.

The following table illustrates the preferred type of one-way clutch for each of the clutches:

| OWC | Type |
| --- | --- |
| A | Dynamic |
| B | Dynamic |
| C | Static |
| D | Static |
| E | Dynamic |

In the design of a dynamic selectable OWC for use in at least one embodiment of the invention, the clutch preferably has the ability to turn on at rest.

The following are general strategies for use of the transmission 10:

Engine is idling in park.
When stopped, the Luk clutch 101 is off.
Option—2 second time delay to turn engine off at a stop.

Reverse
The reverse strategy can be handled three primary ways:
1. Electric sync motor only.
2. Engine "idle off" enabled.
3. Engine idling.

Other considerations are:
1. Rock cycling.
2. Rolling forward.
3. Rolling backward.

Reverse—Electric Sync Motor Only
Assumption: Luk clutch 101 is off initially.
1. Turn "$C_{man}$" clutch on.
2. Turn Luk clutch 101 on.
3. Drive sync motor 111 in reverse.

Reverse—Engine Off (With Reference to FIG. 4g)
Assumption: Luk clutch 101 is off and engine is off, accelerator pedal input starts sequence stops.
1. Turn "$E_{starter}$", "B", and Luk clutch 101 on.
2. Turn sync motor 111 on in forward direct and start engine. Note that clutch "B" is overrunning when sync motor 111 is driving clutch A, the Rav. carrier.
3. As soon as engine starts, slip Luk clutch 101 and ground sync motor 111.
4. Turn on "$D_{rev}$" clutch and relax sync motor 111.
5. Turn Luk clutch 101 on, turn "$E_{starter}$" off.

NOTE: Steps 1 and 2 above takes place in parallel as does steps 4 and 5.

Reverse—Engine On (With Reference to FIG. 4g)
Assumption: Luk clutch 101 is off and engine is on, PRNDL position of R starts sequence.
1. Turn sync motor 111 on in forward direct slightly and then engage "B" clutch. Note that "B" is overrunning when sync motor 111 is driving A2, the Rav. carrier.
2. Reversing sync motor 111 until "A" goes negative, turn on "$D_{rev}$" clutch.
3. Stop sync motor 111 and turn Luk clutch 101 on.

The following illustrates a number of different shifts for the transmission 10.

Figure 4A:
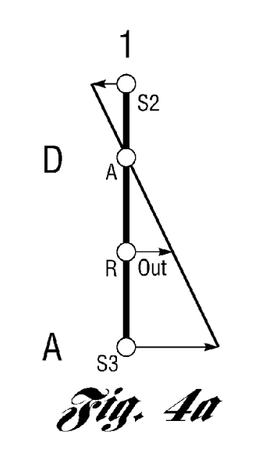
FIGS. 4*a*-4*g* are diagrams which correspond to the various gear states of the transmission of FIG. 2.
Figure 4B:
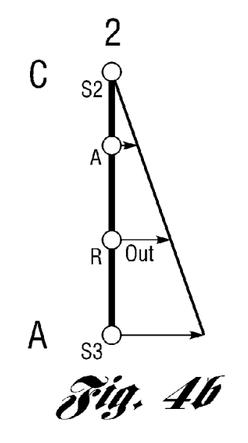
Figure 5:
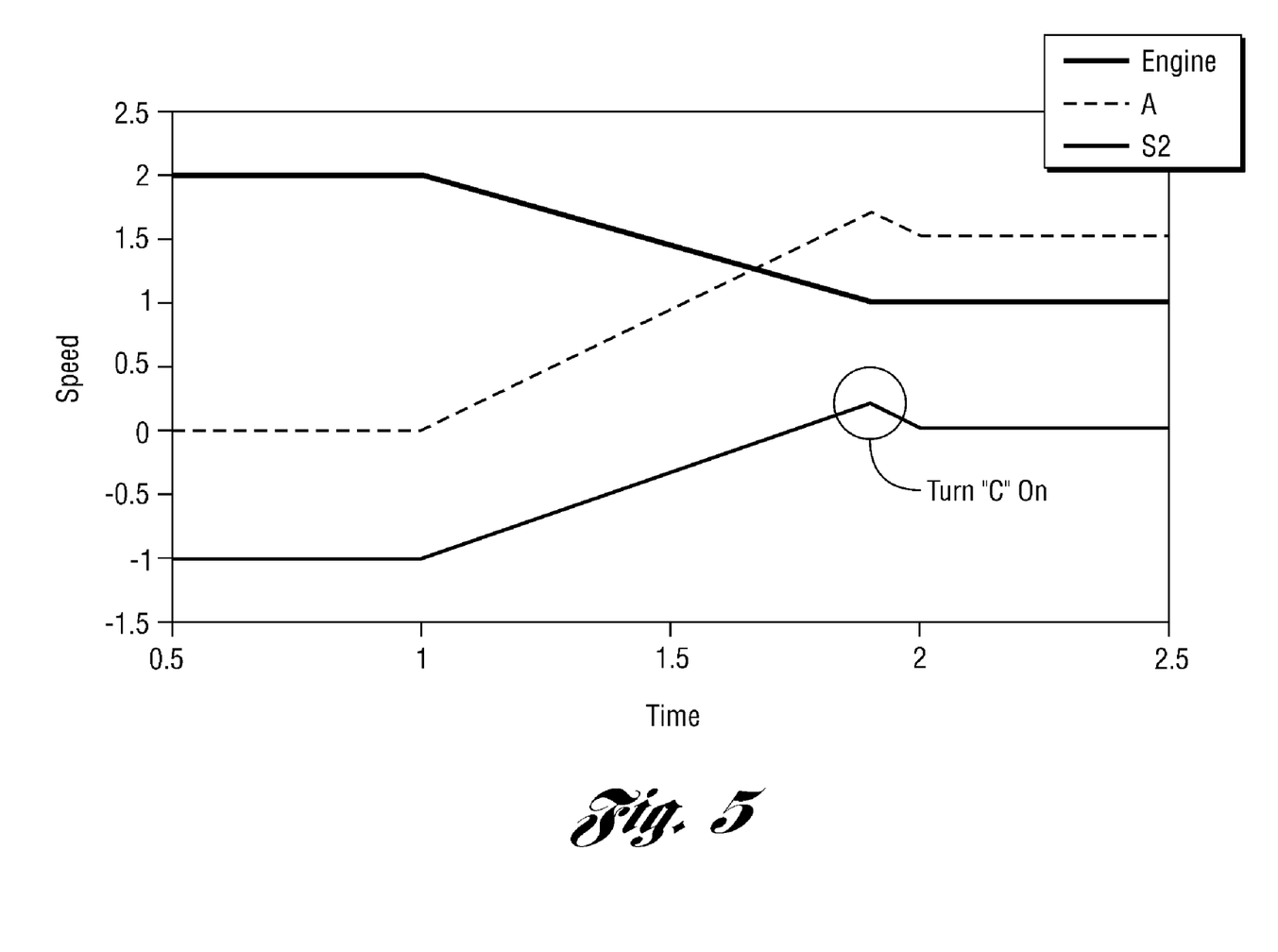
FIG. 5 is a graph of speed versus time for an engine, a carrier A, and a synchronizing node S2, and illustrating an exemplary 1-2 shift.

1-2 Shift (With Reference to FIGS. 5 and 4a and 4b)

| Synchronizing Node | Initial Speed | Engaging Speed |
| --- | --- | --- |
| S2 Clutch "C" | Negative | >=0 |

1) Engine speed and torque is dropped by the computer to the speed in second gear at current engine speed. The Luk ball-ramp clutch 101 may or may not slip.
2) The sync motor 111 speeds up "A" the carrier until S2 is >= 0.
3) Once S2 crosses zero, "C" clutch is turned on.
4) Power returns to the engine, electric motor 111 is turned off, and the Luk ball-ramp clutch 101 is applied if it was ever turned off.
NOTE:
"C" clutch is rotating in the locked direction while S2 is negative and is overrunning when S2 is positive.

Figure 4C:
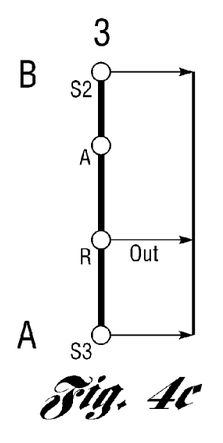

1-3 Shift (With Reference to FIGS. 4a and 4c)

| Synchronizing Node | Initial Speed | Engaging Speed |
| --- | --- | --- |
| S2 Clutch "B" | Negative | >=out |

1) Engine speed and torque is dropped by the computer to third gear speeds. The Luk ball-ramp clutch 101 may or may not slip.
2) The sync motor 111 speeds up "A" the carrier until S2 is >= out.
3) Once S2 >= out, "B" clutch is turned on.
4) Power returns to the engine, electric motor 111 is turned off, and the Luk ball-ramp clutch 101 is applied if it was ever turned off.
NOTE:
"B" clutch is rotating in the locked direction while S2 is < out and is overrunning when S2 is > out.

Figure 4D:
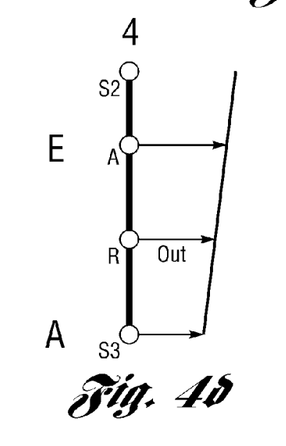

1-4 Shift (With Reference to FIGS. 4a and 4d)

| Synchronizing Node | Initial Speed | Engaging Speed |
| --- | --- | --- |
| A Clutch "E" | 0 | A >= Engine speed (in) |

1) Engine speed and torque is dropped by the computer to the speed in fourth gear at current vehicle speed.
2) The sync motor 111 speeds up "A" the carrier until A is >=to engine speed.
3) "E" clutch is turned on.
4) Power returns to the engine, electric motor 111 is turned off, and the Luk ball-ramp is clutch 101 applied if it was ever turned off.
NOTE:
"E" clutch is rotating in the locked direction while A is less than In/Engine speed and is overrunning when A >= Engine Speed/In.

Figure 4E:
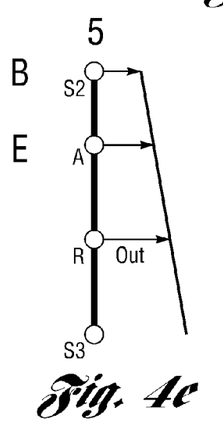

1-5 Shift (With Reference to FIGS. 4a and 4e)

| Synchronizing Node | Initial Speed | Engaging Speed |
|---|---|---|
| S2 - "B" C1 | S2 Negative | S2 >= A1 |
| A - "E" C1 | A = 0 | A >= Engine(in) |

1) Drop engine speed and turn off "A" clutch. NOTE: if needed ("A" not off) blip sync motor 111 in reverse to disengage "A".
2) Run sync motor 111 forward direction until: A >= engine(in) and S2 >= A1
Then engage "B" and "E".
3) Power returns to the engine, electric motor 111 is turned off, and the Luk ball-ramp clutch 101 is applied if it was ever turned off.

Figure 4F:
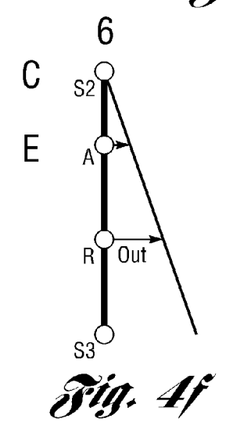
Figure 4G:
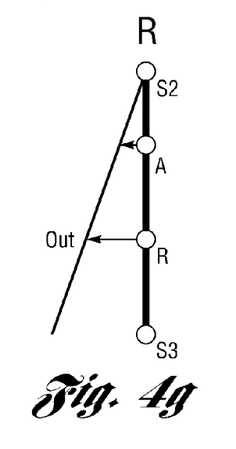

1-6 Shift (With Reference to FIGS. 4a and 4f)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

2-1 Shift (With Reference to FIGS. 4b and 4a)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

2-3 Shift (With Reference to FIGS. 4b and 4c)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

2-4 Shift (With Reference to FIGS. 4b and 4d)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

2-5 Shift (With Reference to FIGS. 4b and 4e)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

2-6 Shift (With Reference to FIGS. 4b and 4f)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

3-1 Shift (With Reference to FIGS. 4c and 4a)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

3-2 Shift (With Reference to FIGS. 4c and 4b)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

3-4 Shift (With Reference to FIGS. 4c and 4d)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

3-5 Shift (With Reference to FIGS. 4c and 4e)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

3-6 Shift (With Reference to FIGS. 4c and 4f)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

4-1 Shift (With Reference to FIGS. 4d and 4a)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

4-2 Shift (With Reference to FIGS. 4d and 4b)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

4-3 Shift (With Reference to FIGS. 4d and 4c)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

4-5 Shift (With Reference to FIGS. 4d and 4e)

| Synchronizing Node | Initial Speed | Engaging Speed |
|---|---|---|
| S2 | Negative | Zero+ |
| Clutch "C" | | |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

4-6 Shift (With Reference to FIGS. 4d and 4f)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

5-1 Shift (With Reference to FIGS. 4e and 4a)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

5-2 Shift (With Reference to FIGS. 4e and 4b)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

5-3 Shift (With Reference to FIGS. 4e and 4c)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

5-4 Shift (With Reference to FIGS. 4e and 4d)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

5-6 Shift (With Reference to FIGS. 4e and 4f)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

6-1 Shift (With Reference to FIGS. 4f and 4a)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

6-2 Shift (With Reference to FIGS. 4f and 4b)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

6-3 Shift (With Reference to FIGS. 4f and 4c)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

6-4 Shift (With Reference to FIGS. 4f and 4d)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

6-5 Shift (With Reference to FIGS. 4f and 4e)

| Synchronizing Node | Initial Speed | Engaging Speed |
|---|---|---|
| S2 Clutch "C" | Negative | Zero+ |

1) Engine speed and torque is dropped by the computer. The Luk ball-ramp clutch may or may not slip.
2) The sync motor speeds up "A" the carrier until S2 is a positive speed.
3) Once S2 crosses zero, "C" clutch is turned on.
4) Power returns to the engine, electric motor is turned off, and the Luk ball-ramp is applied if it was ever turned off.
NOTE:
"C" clutch is rotating in the locked direction while S2 is negative and is overrunning when S2 is positive.

The electric motor of at least one embodiment of the present invention:
  Used to sync shifts for seamless shifting
  Replaces the engine starter/alternator
  Can provide torque during shift
  Possible to launch vehicle
  Idle off potential "golf cart"
  Will be used for softening OWC engagements for lower NVH
  Hybrid functions—regenerative braking.

The following are features of at least one embodiment of the present invention:
  Eliminates:
  Torque converter
  Pump
  Replaces friction clutches with selectable OWCs
  Valve body
  Cooler lines and cooler
  Optional alternator/starter
  Modifies:
  Less resources and infrastructure to design and support at the OEMs
  Splash lube system (splash oil onto a shelf that drains into a feed on the shafts that lube gears, bearing, bushing, and OWCs)
  Calibration independent of altitude, temperature, and moisture
  Shifter much easier, no manual valve, no cable or rooster cone, all electronic (park may or may not require a cable)
  Uses standard step ratio power flows
  Lower engine idle speeds (450 RPM?) no oil pump to maintain
  OWC in every gear state allows for quick engine to vehicle disconnect when coasting (fuel, NVH)
  No energy/power loss to hold clutches on (friction clutch has to maintain pressure)
  OWC has a much higher torque capacity than a friction clutch of comparable size
  Results is a higher power density transmission (less weight and more torque capacity)

The primary advantage of at least one embodiment of the present invention is efficiency. The energy distribution of the fuel in today's vehicle has shown that 5.6% of the losses come from the transmission. These losses are mainly from the pump, converter, and friction clutches. At least one embodiment of the invention eliminates those components, thus significantly reducing those losses. In addition, the electric motor can be used for launch assist, idle off operations, and regenerative braking. This would significantly reduce the 17.2% standby/idle losses and some of the 5.8% braking losses.

Other advantages would be torque capacity and power density. Ratcheting OWCs have high torque capacity in a smaller package. This shrinks the overall size of the transmission creating room to package the electric motor. These devices would also have higher reliability/high mileage numbers over a friction clutch (they do not wear like a friction clutch does). There are also fewer parts in an OWC than in the components that are being eliminated.

Other advantages are as follows:
  Significant fuel economy improvement (better than a powershift transmission)
  Comparable cost to current step ratio box and much less than a hybrid
  Higher power density/torque capacity than a step ratio or powershift transmission
  The primary advantage is efficiency due to the following:
  Parasitic losses significantly reduced—target is less than 1%
  "Idle off" and "coast off" strategies significantly reduce this loss
  Regenerative braking—target ½% reduction in braking While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A high-efficiency vehicular transmission comprising:
a transmission housing;
a compound planetary gear set including first, second, third and fourth elements, the first element connecting with an engine output shaft, and the second element connecting with an output shaft of the transmission;

an electric motor having an output shaft connecting with the third element for changing angular velocity of the third element in response to an electrical signal during a shift to obtain a desired transmission ratio; and a non-friction controllable brake assembly having a coupling state for coupling the fourth element to the housing and an uncoupling state for uncoupling the fourth element from the housing, the brake assembly being non-hydraulically controlled to change state to maintain the desired transmission ratio.

2. The transmission as claimed in claim 1, wherein the brake assembly includes an overrunning coupling assembly which allows the fourth element to free-wheel relative to the housing in the uncoupling state.

3. The transmission as claimed in claim 2, wherein the brake assembly includes a first member coupled to the fourth element, a second member coupled to the housing and at least one ratcheting member for selectively coupling the first and second members together in the coupling state.

4. The transmission as claimed in claim 1, wherein the transmission is an automatic transmission.

5. The transmission as claimed in claim 1, wherein the transmission is a multi-speed, step ratio transmission for automotive vehicles.

6. The transmission as claimed in claim 1 further comprising an electromechanical device to control the state of the brake assembly in response to an electrical signal.

7. The transmission as claimed in claim 6, wherein the electromechanical device includes an electric solenoid.

8. The transmission as claimed in claim 6, wherein the electromechanical device includes a stepper motor.

9. The transmission as claimed in claim 1, wherein the electric motor is mounted within the case.

10. The transmission as claimed in claim 1, wherein the transmission includes a plurality of non-friction, non-hydraulically-operated coupling assemblies including the brake assembly.

11. The transmission as claimed in claim 10, wherein the plurality of non-friction coupling assemblies includes one-way clutch assembly.

12. The transmission as claimed in claim 1, wherein the electric motor synchronizes shifts for seamless shifting between transmission ratios.

13. The transmission as claimed in claim 1, wherein the electric motor provides torque during a shift between transmission ratios.

14. The transmission as claimed in claim 1, wherein the electric motor is utilized for launch assist in response to a control signal.

15. The transmission as claimed in claim 1, wherein the electric motor is utilized in idle off operations in response to a control signal.

16. The transmission as claimed in claim 1, wherein the electric motor softens one-way clutch engagements to obtain lower NVH in response to a control signal.

17. The transmission as claimed in claim 1, wherein the electric motor is utilized for regenerative braking in response to a control signal.

18. A step ratio vehicular transmission comprising:
a compound planetary gear set including first, second, third and fourth elements, the first element connecting with an engine output shaft and the second element connecting with an output shaft of the transmission;
a transmission housing;
an electric motor having an output shaft connecting with the third element for changing angular velocity of the third element in response to an electrical signal during a shift to obtain a desired transmission ratio; and
a non-friction controllable clutch assembly having a coupling state for coupling the fourth element to the engine output shaft and an uncoupling state for uncoupling the fourth element from the engine output shaft, the clutch assembly being non-hydraulically controlled to change state to maintain the desired transmission ratio.

19. A step ratio vehicular transmission comprising:
a compound planetary gear set including first and second sun gears, a ring gear and a carrier, the first sun gear connecting with an engine output shaft and the ring gear connecting with an output shaft of the transmission;
a transmission housing;
an electric motor having an output shaft connecting with the carrier for changing angular velocity of the carrier in response to an electrical signal during a shift to obtain a desired transmission ratio; and
a non-friction controllable brake assembly having a coupling state for coupling the second sun gear to the housing and an uncoupling state for uncoupling the second sun gear from the third carrier the housing, the brake assembly being non-hydraulically controlled to change state to maintain the desired transmission ratio.

20. A high-efficiency vehicular transmission comprising:
a transmission housing;
a compound planetary gear set including first, second, third and fourth elements, the first element connecting with an engine output shaft, and the second element connecting with an output shaft of the transmission;
an electric motor having an output shaft connecting with the third element for changing angular velocity of the third element in response to an electrical signal during a shift to obtain a desired transmission ratio; and
non-friction controllable first and second brake assemblies, the first brake assembly having a coupling state for coupling the fourth element to the housing and an uncoupling state for uncoupling the fourth element from the housing, the second brake assembly having a coupling state to coupling the third element to the housing and an uncoupling state to uncoupling the third element from the housing, the first and second brake assemblies being non-hydraulically controlled to change state to maintain the desired transmission ratio.

21. A step ratio vehicular transmission comprising:
a compound planetary gear set including first, second, third and fourth elements, the first element connecting with an engine output shaft and the second element connecting with an output shaft of the transmission;
a transmission housing;
an electric motor having an output shaft connecting with the third element for changing angular velocity of the third element in response to an electrical signal during a shift to obtain a desired transmission ratio; and
a non-friction controllable clutch assembly having a coupling state for coupling the first element to the engine output shaft and an uncoupling state for uncoupling the first element from the engine output shaft, the clutch assembly being non-hydraulically controlled to change state to maintain the desired transmission ratio.

22. A high-efficiency vehicular transmission comprising:
a transmission housing;
a compound planetary gear set including first, second, third and fourth elements, the first and third elements connecting with an engine output shaft, and the second element connecting with an output shaft of the transmission;

an electric motor having an output shaft connecting with the third element for changing angular velocity of the third element in response to an electrical signal during a shift to obtain a desired transmission ratio; and a non-friction controllable clutch assembly having a coupling state for coupling the third element to the engine output shaft and an uncoupling state for uncoupling the third element from the engine output shaft, the clutch assembly being non-hydraulically controlled to change state to maintain the desired transmission ratio.

* * * * *

UNITED STATES PATENT AND TRADEMARK OFFICE
CERTIFICATE OF CORRECTION

| | | |
|---|---|---|
| PATENT NO. | : 7,942,781 B2 | Page 1 of 1 |
| APPLICATION NO. | : 12/211236 | |
| DATED | : May 17, 2011 | |
| INVENTOR(S) | : John W. Kimes | |

It is certified that error appears in the above-identified patent and that said Letters Patent is hereby corrected as shown below:

Title Page, Item (75)

The Inventor's name is:

-- John W. Kimes --.

Column 19, Line 40, Claim 11:

After "includes" insert -- at least one --.

Column 20, Line 23, Claim 19:

Delete "third carrier" and insert -- carrier or --.

Signed and Sealed this
Twenty-third Day of August, 2011

David J. Kappos
*Director of the United States Patent and Trademark Office*